(12) United States Patent
Kashihara et al.

(10) Patent No.: US 6,445,853 B1
(45) Date of Patent: Sep. 3, 2002

(54) ARRAYED WAVEGUIDE GRATING

(75) Inventors: Kazuhisa Kashihara; Takeshi Nakajima; Tsunetoshi Saito, all of Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 29 days.

(21) Appl. No.: 09/661,091

(22) Filed: Sep. 13, 2000

(30) Foreign Application Priority Data

Sep. 13, 1999 (JP) .......................................... 11-258693

(51) Int. Cl.[7] ................................................. G02B 6/34
(52) U.S. Cl. .......................................................... 385/37
(58) Field of Search ............................. 385/14, 24, 37, 385/46, 122

(56) References Cited

U.S. PATENT DOCUMENTS 5,838,844 A * 11/1998 Van Dam et al. ............. 385/14
5,901,259 A * 5/1999 Ando et al. .................... 385/16
6,304,687 B1 * 10/2001 Inoue et al. .................... 385/14

* cited by examiner

Primary Examiner—Hemang Sanghavi
Assistant Examiner—Scott A Knauss
(74) Attorney, Agent, or Firm—Knobbe, Martens, Olson & Bear LLP.

(57) ABSTRACT

An arrayed waveguide grating comprise at least two half-wavelength plates $8a1$ and $8a2$ crossing the center in the length direction of the plurality of arrayed waveguides 4 disposed in series in the vertical direction of the arrayed waveguides 4. By these half-wavelength plates $8a1$ and $8a2$, a polarization mode conversion part to convert the TE mode and TM mode of signal beams to be transmitted through the arrayed waveguides 4 is formed. The arrayed waveguides 4 are divided into a group of arrayed waveguides 4 crossed by the half-wavelength plate $8a1$ and a group of arrayed waveguides 4 crossed by the half-wavelength plate $8a2$.

4 Claims, 3 Drawing Sheets

ARRAYED WAVEGUIDE GRATING

BACKGROUND OF THE INVENTION

1. Field of the Invention

The present invention relates to an arrayed waveguide grating to be used for optical communications.

2. Description of the Related Art

Recently, in optical communications, as a method for significantly increasing the transmission capacity, dense wavelength division multiplexing system have been successfully researched and developed, and made practicable. In dense wavelength division multiplexing systems, a plurality of optical beams having wavelengths which are different from each other are multiplied for transmission. In such a dense wavelength division multiplexing system, a optical transmission element which transmits only a predetermined wavelength is required. This optical transmission element is used to extract optical beams by each wavelength from transmitted multiplexing optical beams at a light receiver side.

As an example of the optical transmission element, there is an AWG (Arrayed Waveguide Grating) as shown in FIG. 4, for example. In the arrayed waveguide grating, a waveguide structure is formed on substrate 1 as shown in the figure. That is, to the exit side of one or more optical input waveguides 2, first slab waveguide 3 is connected. To the exit side of the first slab waveguide 3, a plurality of arrayed waveguides 4 are connected, and to the exit side of the arrayed waveguides 4, second slab waveguide 5 is connected. To the exit side of the second slab waveguide 5, one or more optical output waveguides 6 are connected.

The arrayed waveguides 4 transmit optical signal led out from the first slab waveguide 3, and are formed so as to be different in length from each other. The lengths of the adjacent arrayed waveguides 4 are different by ΔL, and by these arrayed waveguides 4, diffraction grating 14 is formed.

Also, the optical input waveguides 2 and the optical output waveguides 6 are provided so as to correspond to the number of signal beams which are divided or synthesized by the arrayed waveguide grating and are different in wavelength from each other. The arrayed waveguides 4 are normally provided in a large number, for example, 100. However, in the figure, for simplification, the numbers of the optical input waveguides 2, arrayed waveguides 4, and optical output waveguides 6 are roughly shown. In the same figure, although the arrayed waveguides 4 are shown as arc shapes, however, in actuality, the center part in the length direction of the arrayed waveguides 4 is formed to be more linear than in the figure.

To the optical input waveguides 2, for example, an optical fiber (not illustrated) at the transmission side is connected, whereby wavelength multiplexing signal beams are led-in. Signal beams led-into the first slab waveguide 3 through the optical input waveguides 2 are spread by the diffraction effect, made incident onto the arrayed waveguides 4, and transmitted through the arrayed waveguides 4.

The signal beams transmitted through the arrayed waveguides 4 reach the second slab waveguide 5, and furthermore, converged onto the optical output waveguides 6 and outputted. However, since all lengths of the arrayed waveguides 4 are different from each other, phase differences between individual signal beams transmitted through the arrayed waveguides 4 occur, the phasefront of the optical signal inclines in accordance with the amount of phase differences, and due to the inclination angle, the light focus position is determined. Therefore, the light focus positions of light beams with varying wavelengths are different from each other, and by forming optical output waveguides 6 at the positions, signal beams which are different in wavelength can be outputted from the individual optical output waveguides 6 by each wavelength.

Furthermore, since the arrayed waveguide grating uses the principle of optical reversibility, the grating has a function as a spectral synthesizer as well as a function as a spectral divider. That is, if a plurality of signal beams having different wavelengths are made incident from the optical output waveguides 6, respectively, these signal beams pass through the transmission path opposite to the above path, and are synthesized by the arrayed waveguides 4, and then exit from the optical input waveguides 2.

In such an arrayed waveguide grating, as mentioned above, the wavelength resolution of the diffraction grating is in proportion to the difference (ΔL) in length between the arrayed waveguides 4 comprising the diffraction grating. Therefore, by designing ΔL to be large, spectral synthesis and division of wavelength multiplexing signal beams with narrow wavelength intervals become possible although they are impossible in a prior-art diffraction grating. That is, the arrayed waveguide grating can show spectral synthesis and division functions for a plurality of signal beams (a function to divide or synthesize a plurality of optical signals with wavelength intervals of 1 nm or less) required to realize high density dense wavelength multiplexing systems.

Among prior-art arrayed waveguide gratings, some arrayed waveguide gratings divide or synthesize optical signals of 16 wavelengths which are different from each other and have wavelength intervals of, for example, 100 GHz. A design example of such an arrayed waveguide grating shall be described. In this arrayed waveguide grating, the FSR (Free Spectral Range) is 25 nm, the focal lengths of the first and second slab waveguides 3 and 5 are 11.9 mm, respectively, the diffraction order is 61, and ΔL=65.2 $\mu$m. Also, in this arrayed waveguide grating, the aligning pitch of the arrayed waveguides 4 at the center in the length direction thereof is 25 $\mu$m, and the aligning pitch of the arrayed waveguides 4 at each connection point to the first and second slab waveguides 3 and 5 is 20 $\mu$m.

In this design example, since the number of the arrayed waveguides 4 is set to 200, and the aligning pitch of the arrayed waveguides 4 is 25 $\mu$m at the center in the length direction thereof, the width of the arrayed waveguide forming range (A in FIG. 4) at the center in the length direction of the arrayed waveguides 4 is approximately 5 mm (19×25 $\mu$m=4.975 mm).

In the above arrayed waveguide grating, it is generally known that, since the TE mode transmission speed and TM mode transmission speed for light beams being transmitted through the arrayed waveguides 4 are different from each other, polarization dependence loss occurs.

Therefore, in order to eliminate this polarization dependence loss, as shown in FIG. 4, in the prior-art arrayed waveguide grating, a half-wavelength plate 8 (8a) is provided so as to be across the center in the length direction of all arrayed waveguides 4. The half-wavelength plate 8 (8a) is inserted into slit 7 which is formed so as to be orthogonal to the arrayed waveguides 4 at the center in the length direction of the waveguides.

The half-wavelength plate 8 (8a) functions as a polarization mode conversion part which converts the TE mode and TM mode of light beams to be transmitted through the arrayed waveguides 4. If the half-wavelength plate 8 (8a) is provided at the center in the length direction of the arrayed waveguides 4, before and after the half-wavelength plate 8 (8a), the TE mode is converted to the TM mode, or the TM mode is converted to the TE mode. By this conversion, the difference in transmission speed between the TE mode and TM mode occurring before optical beams transmitted through the arrayed waveguides 4 are made incident onto the half-wavelength plate 8 (8a) is canceled until the optical beams are transmitted to the exit side of the arrayed waveguides 4, whereby polarization dependence loss is eliminated.

The half-wavelength plate 8 (8a) is provided so that the vertical length (B in the same figure) corresponds to the width of the arrayed waveguide forming range (A in the same figure) at the center in the length direction of the arrayed waveguides 4. In the arrayed waveguide grating of the abovementioned design example, as mentioned above, the width A of the arrayed waveguide forming range at the center in the length direction of the arrayed waveguides 4 is approximately 5 mm. Therefore, in the arrayed waveguide diffraction grating of the abovementioned design example, the half-wavelength plate 8 (8a) whose length shown by B in the figure is 7 mm is inserted, adhered, and fixed.

If the number of multiplexing wavelengths increases in dense wavelength division multiplexing systems, it is required to increase the number of wavelengths to be divided and the number of wavelengths to be synthesized by the arrayed waveguide grating to be used as a optical transmission element in accordance with the increase. In the case where the number of wavelengths to be divided or synthesized by the arrayed waveguide grating is increased, in terms of designing, the number of arrayed waveguides 4 increases.

However, in the arrayed waveguide grating in which the number of arrayed waveguides 4 is large, the width of the arrayed waveguide forming range (A in FIG. 4) at the center in the length direction of the arrayed waveguides 4 becomes wider. Therefore, although the length of the half-wavelength plate 8 provided in accordance with the width of the arrayed waveguide forming range must also be increased, at present, the length of the half-wavelength plate 8 which has been generally used is approximately 5 through 10 mm. And, a half-wavelength plate 8 whose length is longer than that of the general plate is an article specially made to order, which is expensive, and therefore, an arrayed waveguide grating with a longer half-wavelength plate provided also becomes expensive.

For example, the designed values of specifications of the arrayed waveguide grating for dividing or synthesizing optical signals of 32 wavelengths which are different from each other and have wavelength intervals of 100 GHz are as follows. That is, the FSR is 51 nm, the focal lengths of the first and second slab waveguides 3 and 5 are 24.3 mm, respectively, diffraction order m is 30, ΔL=32.1 µm, and the number of alignments of the arrayed waveguides 4 are 406. The aligning pitch of the arrayed waveguides 4 at the center in the length direction thereof is 25 µm, and the aligning pitch of the arrayed waveguides 4 at each connection point to the first and second slab waveguides 3 and 5 is 20 µm. Therefore, as shown in FIG. 5, the width of the arrayed waveguide forming range (A in FIG. 5) at the center in the length direction of the arrayed waveguides 4 is increased to be 10.1 mm (405×25 µm=10.1 mm).

If so, approximately 12 mm is required as the length B of the half-wavelength plate 8 (8t) to be inserted into the center in the length direction of the arrayed waveguides 4, however, the half-wavelength plate 8 (8t) with a length of approximately 12 mm is an article specially made to order, which is expensive. Furthermore, it is extremely difficult to precisely insert the half-wavelength plate 8 (8t) with a length of 12 mm into the arrayed waveguides 4, and when inserting the half-wavelength plate, it may bend or take-in bubbles in an adhesive, and therefore, crosstalk becomes worse such as approximately −23 dB by roughly 10 dB.

The present invention is made in order to solve the abovementioned problems.

SUMMARY OF THE INVENTION

In an arrayed waveguide grating which is arranged so that a waveguide structure is provided in which a first slab waveguide is connected to the exit side of one or more optical input waveguides, a plurality of arrayed waveguides which have varying lengths to transmit optical signal led out from the first slab waveguide are connected to the exit side of the first slab waveguide, a second slab waveguide is connected to the exit side of the plurality of arrayed waveguides, and a plurality of optical output waveguides are connected to the exit side of the second slab waveguide, a plurality of optical signals which are inputted from the optical input waveguides and are different in wavelength from each other are transmitted by being provided with phase differences for each wavelength by the arrayed waveguides, and made incident onto individual optical output waveguides for each wavelength, whereby light beams with varying wavelengths are outputted from the light output waveguides, wherein a polarization mode conversion part to converts the TE mode and TM mode of light to be transmitted through the arrayed waveguides is provided so as to cross the middle portion in the length direction of all arrayed waveguides, and said mode conversion part is formed by providing a plurality of half-wavelength plates in series in the vertical direction of the arrayed waveguides so as to cross the plurality of arrayed wave guides, and a plurality of arrayed waveguides crossed by one of the half-wavelength plates is defined as one arrayed waveguide group, and based on this, arrayed waveguide groups of a number corresponding to the number of disposed half-wavelength plates are formed. Advantageously, the interval between adjacent arrayed waveguide groups at the disposed portion of the half-wavelength plates is set to 50 µm or more.

BRIEF DESCRIPTION OF THE DRAWINGS

These and other objects and advantages of the present invention will be come more apparent and more readily appreciated from the following detailed description of the exemplary embodiments of the invention taken in conjunction with the accompanying drawings, in which.

DETAILED DESCRIPTION OF THE INVENTION

The abovementioned construction may be characterized in that the polarization mode conversion part to convert the TE mode and TM mode of light to be transmitted through the arrayed waveguides is provided so as to cross the middle portion in the length direction of all arrayed waveguides. Therefore, by the invention, polarization dependence loss caused due to a difference in transmission speed between the TE mode and TM mode of light to be transmitted through the arrayed waveguides can be eliminated.

Furthermore, in the prior-art arrayed waveguide diffraction grating, since the abovementioned polarization mode conversion part is formed of one half-wavelength plate, in the case where the number of alignments of the arrayed waveguides is large and the width of the arrayed waveguide forming range is wide, a long half-wavelength plate having a length corresponding to the width must be provided. The long half-wavelength plate is expensive and it is difficult to insert it into the arrayed waveguide diffraction grating. On the other hand, in the arrayed waveguide diffraction grating of the invention, since a plurality of half-wavelength plates are aligned in series in the vertical direction of the plurality of arrayed waveguides so as to cross them, the length of each of the half-wavelength plates can be made short. Therefore, the invention can reduce the cost of the half-wavelength plates forming the polarization mode conversion part.

Furthermore, in the invention, a plurality of arrayed waveguides crossed by one half-wavelength plate is defined as one arrayed waveguide group, and based on this, arrayed waveguide groups are formed by a number corresponding to the number of the disposed half-wavelength plates, and the interval between adjacent arrayed waveguide groups at the disposed portion of the half-wavelength plates is set to 50 μm or more. Therefore, in the invention, by properly setting the interval between the adjacent arrayed waveguide groups, the operation to insert the half-wavelength plates can be easily carried out. Accordingly, by the invention, an arrayed waveguide grating is realized which can be easily manufactured, in which the half-wavelength plates can be prevented from bending and taking-in bubbles when being inserted, and an increase in crosswalk can be suppressed.

Figure 1:
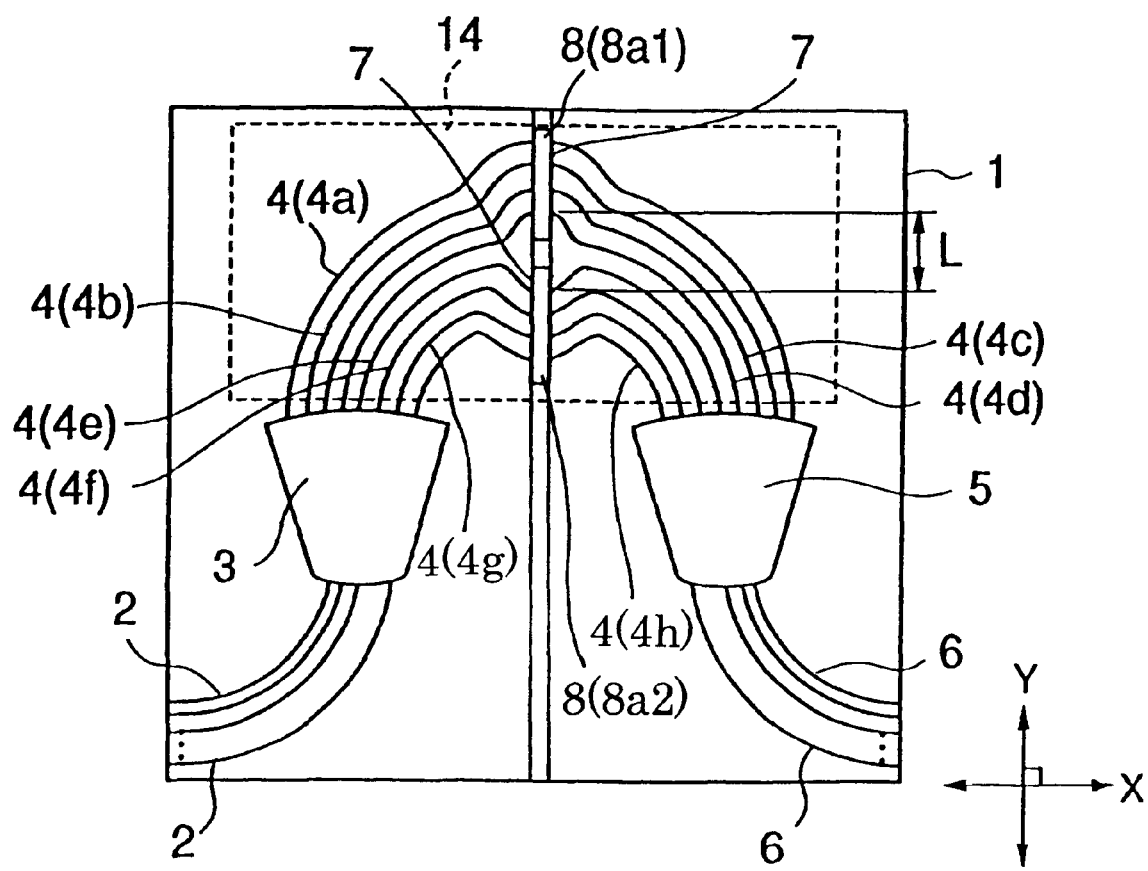
FIG. 1 is a constructional view of the main part schematically showing an embodiment, of the arrayed waveguide grating relating to the invention.

Hereinafter, the embodiment of the invention shall be described with reference to the drawings. In the description of the embodiment, the same parts as in the prior-art example are attached with the same symbols, and overlapping description thereof is omitted. FIG. 1 is a plane view schematically showing an embodiment of the arrayed waveguide grating. This embodiment is, as the arrayed waveguide grating shown in FIG. 5, an arrayed waveguide grating which divides or synthesizes optical signals of 32 wavelengths which are different from each other and have wavelength intervals of 100 GHz. The waveguide structure and designed dimensions of the arrayed waveguide grating of this embodiment are roughly the same as those of the arrayed waveguide grating shown in FIG. 5.

Figure 5:
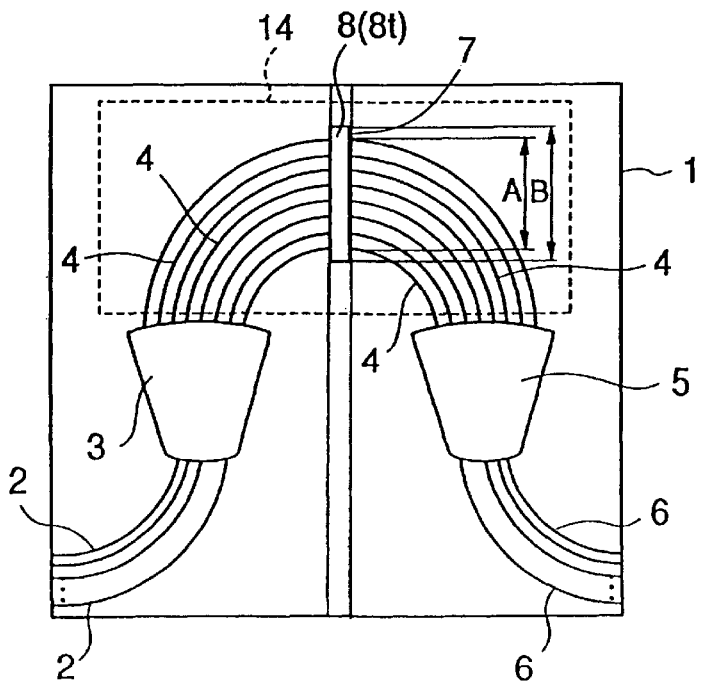
FIG. 5 is an explanatory view schematically showing the arrayed waveguide grating which is arranged so that the number of disposed arrayed waveguides is increased, and accordingly, a long half-wavelength plate is provided.

The first aspect of this embodiment differing from the arrayed waveguide grating shown in FIG. 5 is that two half-wavelength plates 8 (8a1, 8a2) crossing the plurality (here, 406) of arrayed waveguides 4 are aligned in series in the disposed direction of the arrayed waveguides 4, whereby the polarization mode conversion part is formed. The half-wavelength plate 8 (8a1) and half-wavelength plate 8 (8a2) are arranged in the same manner as the half-wavelength plate 8 (8a) provided in the prior-art arrayed waveguide grating, and the lengths thereof are 7 mm.

The second aspect of this embodiment is that a plurality of arrayed waveguides crossed by each half-wavelength plate 8a1 or 8a2 is defined as one arrayed waveguide group, and the interval between adjacent arrayed waveguide groups at the disposed portion of the half-wavelength plates is set to 80 μm. Furthermore, as in this embodiment, by defining the plurality of arrayed waveguides crossed by each half-wavelength plate 8a1 or 8a2 as one arrayed waveguide group, arrayed waveguide groups of a number corresponding to the number (2 in this embodiment) of disposed half-wavelength plates 8a1 and 8a2 are formed.

In other words, in the present embodiment, 406 arrayed waveguides 4 are divided into 203 arrayed waveguides 4 crossed by the half-wavelength plate 8a1 and 203 arrayed waveguides 4 crossed by the half-wavelength plate 8a2. And, in the present embodiment, the interval between the arrayed waveguide groups thus formed is set to 80 μm.

FIG. 1 schematically shows the arrayed waveguide grating of the present embodiment. In FIG. 1, the arrayed waveguides 4 crossed by the half-wavelength plate 8a1 are shown by symbols 4a through 4d, and the arrayed waveguides 4 crossed by the half-wavelength plate 8a2 are shown by symbols 4e through 4h. Furthermore, in FIG. 1, the interval of the arrayed waveguides at the disposed portion of the half-wavelength plate 8a1 and 8a2 is shown by the interval L between the arrayed waveguide 4d and arrayed waveguide 4e.

Figure 2:
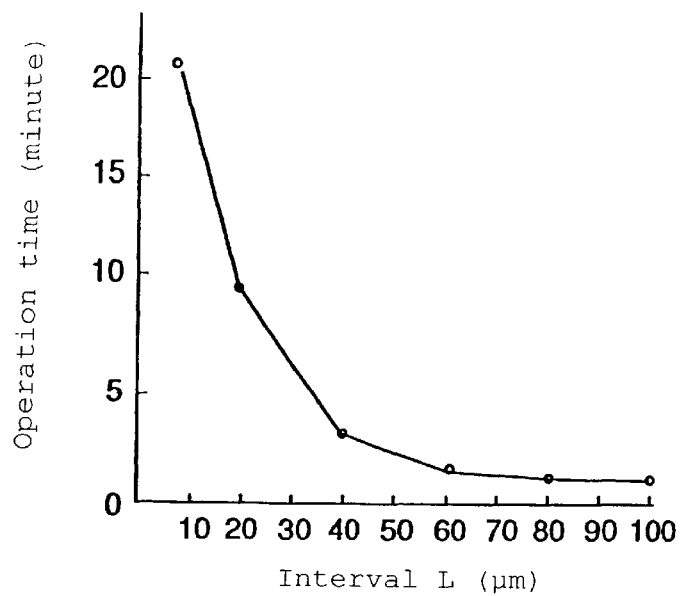
FIG. 2 is a graph showing the relationship between the interval between arrayed waveguide groups and the operation time for insertion of the half-wavelength plates when the arrayed waveguides provided in the arrayed waveguide grating is divided into two arrayed waveguide groups.

In order to determine the arrangement of the embodiment, the inventor variously changed the intervals L between the arrayed waveguide groups, and measured the relationship between the interval L and the operation time to insert the half-wavelength plates 8a1 and 8a2. The results of these measurements are shown in FIG. 2. As is clearly understood from this figure, in the case where the arrayed waveguides 4 in the arrayed waveguide grating are divided into two or more groups, if the interval between the arrayed waveguide groups is 50 μm or more, the operation time becomes approximately 2 through 3 minutes or less. This operation time to insert the half-wavelength plates 8a1 and 8a2 is remarkably shorter than the operation time to insert the half-wavelength plates 8a1 and 8a2 in the case of the interval L of 10 μm.

Therefore, in the present embodiment, the interval L between the arrayed waveguide groups at the disposed portion of the half-wavelength plates 8a1 and 8a2 is set to 80 μm.

Figure 3A:
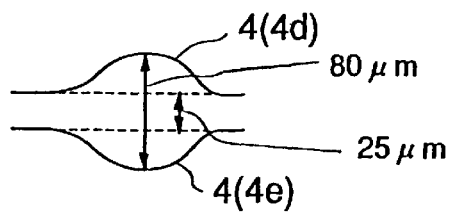
FIG. 3A and FIG. 3B are explanatory views of the shape at the center in the length direction and length in the X direction of the arrayed waveguides in a second embodiment.

Furthermore, in this embodiment, by setting the interval L to 80 μm, the forms of the arrayed waveguides 4 are made different from those of the prior-art arrayed waveguides 4. That is, in the prior-art arrayed waveguide grating, all intervals between the arrayed waveguides 4 aligned in series at the center in the length direction thereof are set to be equal, for example, 25 μm. On the other hand, in the present embodiment, as shown in FIG. 3A, the interval between the lowest arrayed waveguide 4 (arrayed waveguide 4d in the figure) among the arrayed waveguides 4 crossed by the half-wavelength plate 8a1 and the highest arrayed waveguide 4 (arrayed waveguide 4e in the figure) among the arrayed waveguides 4 crossed by the half-wavelength plate 8a2 is set to 80 μm.

Figure 3B:
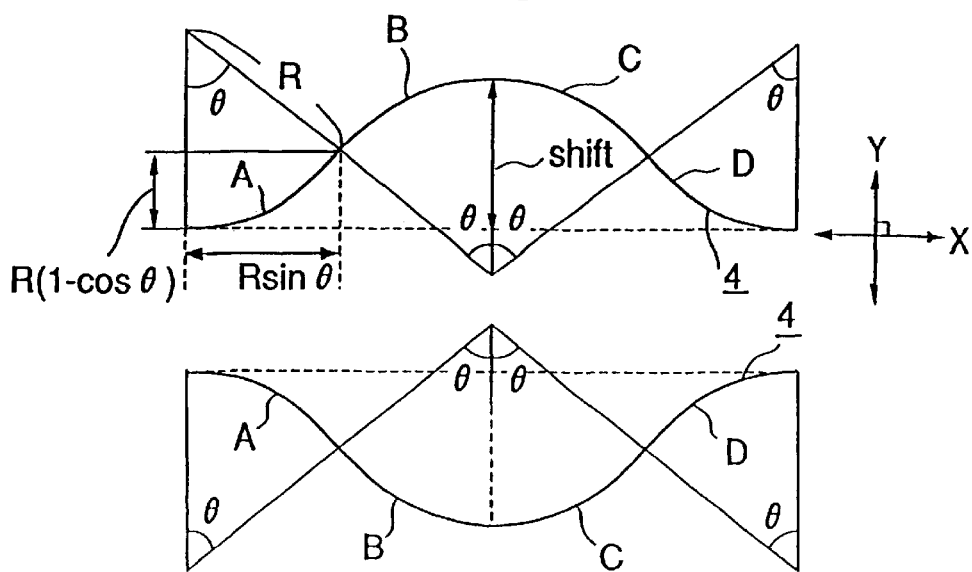
Figure 4:
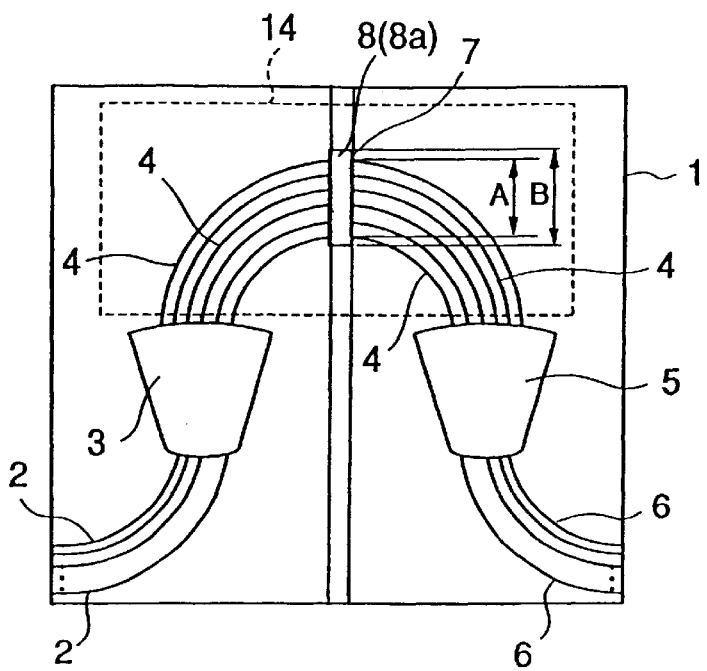
FIG. 4 is an explanatory view schematically showing the construction of the prior-art arrayed waveguide grating.

Therefore, although the center part in the length direction of the arrayed waveguides 4 is linear in the prior-art arrayed waveguide grating, in the present embodiment, by changing pitches, the forms of the arrayed waveguides 4 are changed as shown in FIG. 3B. That is, when the length of the transformed portion is divided into quarters, and the respective portions are defined as A, B, C, and D, these respective portions A, B, C, and D are set to be arcs with center angles θ and radiuses R, and the lengths in the X direction of the respective arrayed waveguides 4 are lengthened by 4R sin θ. Herein, since the shift=2R (1−cos θ), cos θ=1−(shift/2R), and θ=cos$^{-1}$ (1−shift/2R). The unit for the R and shift is μm.

In the present embodiment, since R=5000 μm, and the interval L is set to 80 μm, the shift is (80−25)/2=27.5 μm, and 4R sin θ=1482 μm, which is approximately 1.5 mm. Therefore, the arrayed waveguide grating of the second embodiment of the invention is arranged so that the lengths of the arrayed waveguides in the X direction of the figure are lengthened to be approximately 1.5 mm longer than those of the arrayed waveguides 4 in the prior-art arrayed waveguide grating.

The present embodiment is thus arranged, and two half-wavelength plates 8 (8a1, 8a2) to be inserted into the center in the length direction of the arrayed waveguides 4 have a length of 7 mm, which have been priorly used. Therefore, the insertion of these half-wavelength plates 8 (8a1, 8a2) is easier than the insertion of the long half-wavelength plate 8 (8t) shown in FIG. 5.

Furthermore, as shown in FIG. 2, in the case where the interval L between the arrayed waveguide groups is small, the operation to insert the half-wavelength plates 8a1 and 8a2 takes a longer time, and therefore, operation performance of half-wavelength plates 8a1 and 8a2 is insufficient. On the other hand, in the present embodiment, since the interval between the arrayed waveguide groups is set to 80 μm more than 50 μm, the operation time to insert the half-wavelength plates 8a1 and 8a2 can be significantly shortened in comparison with the operation time to insert half-wavelength plates 8a1 and 8a2 in the case of the interval L of 10 μm.

Therefore, in the present embodiment, as shown in FIG. 5, problems (bending of half-wavelength plate 8 and taking of bubbles included in an adhesive into the plate) occurring when the one long half-wavelength plate 8 (8t) is inserted for manufacturing an arrayed waveguide grating can be suppressed, whereby an arrayed waveguide grating can be manufactured with excellent operation performance in a short time. In the arrayed waveguide grating of the present embodiment, the crosstalk becomes approximately −36 dB, and therefore, the crosstalk property can be prevented from becoming worse.

Furthermore, according to the present embodiment, the two half-wavelength plates 8 (8a1, 8a2) to be inserted into the center in the length direction of the arrayed waveguides 4 are the half-wavelength plates 8 which have been priorly used. Therefore, the cost of the half-wavelength plates 8 (8a1, 8a2) is reasonable and lower than that of the one long half-wavelength plate 8 (8t) shown in FIG. 5. Therefore, the arrayed waveguide grating of the present embodiment can be made inexpensive.

Moreover, the present invention is not limited to the abovementioned embodiment, but can employ various embodiments. For example, the arrayed waveguide grating of the abovementioned embodiment is arranged so as to divide or synthesize optical signals of 32 wavelengths which are different from each other and has wavelength intervals of 100 GHz. However, the wavelength intervals and the number of wavelengths of the optical signals to be divided or synthesized by the arrayed waveguide grating of the invention are not especially limited, but are properly set.

In addition, in the abovementioned embodiment, the plurality of arrayed waveguides 4 are divided into two groups to form the arrayed waveguide grating, however, in accordance with the total number of disposed arrayed waveguides 4, 3 or more arrayed waveguide groups can be formed.

Furthermore, in the abovementioned embodiment, the interval L between the arrayed waveguide groups is set to 80 μm, however, the interval L between the adjacent arrayed waveguide groups is not always set to 80 μm. By setting the interval L between the adjacent arrayed waveguide groups to be a proper interval of 50 μm or more, the operation to insert the half-wavelength plates 8 can be efficiently carried out. Also, currently, an arrayed waveguide grating has been manufactured by cutting-out a plurality of substrates for an arrayed waveguide grating from one silicon wafer, for example. Therefore, when the same size of the arrayed waveguide grating as that of the wafer size is taken into consideration, in the present state, it is appropriate that the abovementioned interval L is set to 1 mm or less. However, depending on the wafer size and arrayed waveguide grating size, the interval L can be set to be more than 1 mm.

What is claimed is:

1. An arrayed waveguide grating comprising:
   a first slab waveguide connected to the exit side of one or more optical input waveguides;
   a plurality of arrayed waveguides with different length led out from the first slab waveguide and connected to the exit side of the first slab waveguide;
   a second slab waveguide connected to the exit side of the plurality of arrayed waveguides;
   a plurality of optical output waveguides connected to the exit side of the second slab waveguide; and
   a plurality of half-wavelength plates crossing the plurality of arrayed waveguides in series in the vertical direction of the arrayed waveguides, wherein each half wavelength plate is coupled to a plurality of said arrayed waveguides forming separated groups thereof.

2. The arrayed waveguide grating of claim 1, wherein the spacing between adjacent arrayed waveguide groups at the half-wavelength plates is approximately 50 μm or more.

3. A method of making an arrayed waveguide grating comprising:
   forming a plurality of arrayed waveguides;
   separating said plurality of arrayed waveguides into two or more groups, wherein each group comprises a plurality of waveguides having different lengths; and
   coupling each group to a different half-wavelength plate.

4. The method of claim 3, wherein said separating comprises separating by at least about 50 μm.

* * * * *